(12) United States Patent
Autard et al.

(10) Patent No.: US 10,779,585 B2
(45) Date of Patent: Sep. 22, 2020

(54) GARMENT FOR HARNESS SYSTEM (71) Applicant: IHC Design LLC, Westport, CT (US)

(72) Inventors: Eric P. Autard, Westport, CT (US); Sabine Beysel, Westport, CT (US)

(73) Assignee: IHC Design, LLC, Westport, CT (US)

( * ) Notice: Subject to any disclaimer, the term of this patent is extended or adjusted under 35 U.S.C. 154(b) by 123 days.

(21) Appl. No.: 15/529,073

(22) PCT Filed: Dec. 7, 2016

(86) PCT No.: PCT/US2016/065425
§ 371 (c)(1),
(2) Date: May 23, 2017

(87) PCT Pub. No.: WO2017/184210
PCT Pub. Date: Oct. 26, 2017

(65) Prior Publication Data
US 2018/0184730 A1    Jul. 5, 2018

Related U.S. Application Data

(60) Provisional application No. 62/325,876, filed on Apr. 21, 2016.

(51) Int. Cl.
*A41D 11/00* (2006.01)
*A41D 13/00* (2006.01)
*A41D 27/04* (2006.01)
*B60R 22/10* (2006.01)
*A41D 27/18* (2006.01)
(Continued)

(52) U.S. Cl.
CPC ............... *A41D 11/00* (2013.01); *A41D 3/02* (2013.01); *A41D 13/0007* (2013.01); *A41D 27/00* (2013.01); *A41D 27/04* (2013.01); *A41D 27/18* (2013.01); *B32B 3/06* (2013.01);
(Continued)

(58) Field of Classification Search
CPC .......... A41D 11/00; A41D 27/00; A41D 3/02; A41D 13/007; B32B 3/06; B32B 7/02; B32B 2437/00; B60R 22/105
See application file for complete search history.

(56) References Cited

U.S. PATENT DOCUMENTS 200,226 A  *  2/1878  Fry ........................... A41D 3/02
                                                                    2/85
1,281,430 A     10/1918  Turner
(Continued)

OTHER PUBLICATIONS

ISA/U.S. International Search Report and Written Opinion dated Feb. 21, 2017.
(Continued)

*Primary Examiner* — Katharine Gracz
(74) *Attorney, Agent, or Firm* — Granz Pollard, LLC (57) ABSTRACT

A garment wearable by an individual using a harness system of a vehicle seat has an inner front layer, and an adjacent outer front layer comprising a left panel, a right panel and a coupling member adapted to join or separate the left and right panels. The garment is adapted to receive one or more harness straps of the harness system between the inner front layer and the outer front layer when the one or more harness straps are routed from a shoulder region to a waist region of the garment, and when so routed, the one or more harness straps lie flush against at least a chest area of the inner front layer.

22 Claims, 10 Drawing Sheets

(51) Int. Cl.
*A41D 3/02* (2006.01)
*A41D 27/00* (2006.01)
*B32B 3/06* (2006.01)
*B32B 7/02* (2019.01)

(52) U.S. Cl.
CPC .............. *B32B 7/02* (2013.01); *B60R 22/105* (2013.01); *A41D 2400/80* (2013.01); *B32B 2437/00* (2013.01)

(56) References Cited

U.S. PATENT DOCUMENTS

| | | | |
|---|---|---|---|
| 1,906,912 A | 5/1933 | Lockwood | |
| 2,051,482 A * | 8/1936 | Hyman | A41D 15/00 2/90 |
| 4,320,538 A * | 3/1982 | Saft | A41D 15/007 2/102 |
| 4,843,647 A * | 7/1989 | Phillips, Sr. | A41D 15/04 2/69 |
| 4,999,850 A * | 3/1991 | Grilliot | A41D 13/00 2/126 |
| 5,161,258 A * | 11/1992 | Coltrain | A41D 11/00 2/102 |
| 6,314,578 B1 * | 11/2001 | Masuda | B60N 2/265 2/102 |
| 6,367,882 B1 | 4/2002 | Van Druff et al. | |
| 6,408,439 B1 | 6/2002 | Garforth-Crippen | |
| 6,698,025 B1 * | 3/2004 | Hughes | A41B 13/005 2/69 |
| 7,117,539 B1 * | 10/2006 | Baacke | A41D 1/04 2/102 |
| 8,118,364 B2 | 2/2012 | Davis | |
| 8,225,422 B1 | 7/2012 | McSparron | |
| 8,479,315 B2 | 7/2013 | Kelling | |
| 2005/0017566 A1 | 1/2005 | Rizk | |
| 2009/0070914 A1 * | 3/2009 | Landeck | A41D 1/02 2/95 |
| 2009/0100566 A1 * | 4/2009 | Schiavino | A41B 13/00 2/80 |
| 2010/0115685 A1 | 5/2010 | Hepler | |
| 2010/0229278 A1 * | 9/2010 | Bates | A41D 13/0002 2/115 |
| 2010/0282803 A1 * | 11/2010 | Simmons | A41D 13/0007 224/576 |
| 2013/0007940 A1 | 1/2013 | Ryerson | |
| 2013/0031703 A1 * | 2/2013 | Curtis | A41B 7/06 2/455 |
| 2015/0181953 A1 | 7/2015 | Brown | |
| 2015/0191147 A1 * | 7/2015 | Cobb | B60R 22/105 24/68 SB |
| 2017/0013888 A1 * | 1/2017 | Webb | A41D 13/0015 |
| 2017/0238623 A1 | 8/2017 | Wallace et al. | |

OTHER PUBLICATIONS

Canadian Office Action in Canadian Application No. 3,018,,481, dated Jul. 16, 2019, 6 pages.
Canadian Office Action in Canadian Application No. 3,018,481, dated Apr. 8, 2020, 4 pages.
Extended European Search Report for European Application No. 16899686.6, dated Sep. 30, 2019, 7 pages.
European Office Action in European Application No. 16899686.6, dated May 13, 2020, 4 pages.

\* cited by examiner

GARMENT FOR HARNESS SYSTEM

BACKGROUND

The inventive subject matter is generally directed to a garment wearable by an individual using a harness system for a permanent or removable vehicle seat. More particularly, it is directed to a garment adapted to keep an individual warm in a vehicle seat, but compensating against the loss of safety that may be inherent in conventional garments.

A vehicle restraint system, such as a seat belt, is designed to secure the occupant of a vehicle against harmful movement that may result during a collision or a sudden stop. The restraint system may include a lap belt that goes over the waist. The restraint system may also include a shoulder harness that goes diagonally over the vehicle occupant's outboard shoulder and is buckled inboard of his or her lap. The shoulder harness may attach to the lap belt tongue, or it may have a tongue and buckle completely separate from those of the lap belt. A child restraint system, also commonly referred to as a child safety seat or a car seat, is a restraint which is secured to the seat of an automobile or other vehicle equipped with safety harnesses or seat belts, to hold a child in the event of a crash. Many regions require children defined by age, weight, and/or height to use a government-approved child safety seat when riding in a vehicle. Child safety seats provide passive restraints and must be properly used to be effective. However, many child safety restraints are not used properly. For example, the chest clips of the harness should be placed even with the child's armpits. However, often the chest clips are placed on the child either too low (e.g., near the abdomen) or too high (e.g., near the neck) on the child. This may happen if parents are inexperienced or do not pay enough attention. In some cases, the chest clips may be originally placed in the correct position on the child but gradually slid away from the desired position during transport.

In addition, the straps of the harness should lie flat against the child's chest and over his or her hips with no slack. Failing to tightly secure the child's car-seat straps can result in a child being jostled too much or becoming completely displaced in a crash. This poses a significant risk in winter or other cold environments when loose or bulky garments can affect the fit of the car seat to the child and can interfere with the proper function of the restraint system. When a child is wearing a winter coat, it may feel like he or she is strapped snugly into a car seat when the straps are actually dangerously loose. For example, it has been reported that the average puffy coat/snowsuit may add about 4 inches of slack into the child's harness straps, which bulk can significantly increase the risk of injury, especially the risk of head injury. In addition, bulk creates slack, and a child in a car seat may wiggle and/or play with the restraint system of the car seat, and slide his or her arms out of the straps. This can cause potential harm to the child and distract the driver. For an older child outgrown the car seat or even an adult who uses a regular vehicle restraint system (e.g., a shoulder harness and/or lap belt), wearing a puffy garment may also pose a safety risk because there may be slack in the seat belts between the wearer's body and the webbing.

Others have attempted to solve the aforementioned problems. For example, U.S. Pat. No. 8,118,364 disclosed a travel blanket that can be placed upon an infant in a car seat. U.S. Pat. No. 8,225,422 discloses a clothing for a child in a car seat, the clothing having two parts, a body having an always-open area and a blanket that is sized to form a covering over the always-open area. However, in both cases, the blankets may become loose and/or the child may pull the blanket off. U.S. Pat. No. 6,408,439 discloses a garment having an upper portion that can be wrapped around a child's torso from the front while the child is seated in a car seat. There are fasteners along the edges that can be fastened behind the wearer. The garment is essentially a front covering, which lacks appearance of regular clothing that may be worn by a child not sitting a car seat. U.S. Pub. No. 2013/0007940 discloses an infant garment with an open back for placement on an infant while positioned in a car seat. Similarly, this rear-opening garment is specially designed for car seat, lacking the appearance of a regular clothing for a child not in a car seat. U.S. Pub. No. 2010/0115685 discloses a jacket-type garment without a front closure to prevent a child in a car seat from move his or her arms out of the harness straps. However, the disclosed garment must be permanently attached to the car seat. U.S. Pub. No. 2005/0017566 discloses a child's garment having a rear portion that is worn like a vest but does not cover the chest area of the child, and a front portion that is attached to the rear portion to help retain the position of the belts of the car seat and prevent a child from wiggling out of the belts. Nonetheless, the front portion and the rear portion are detached from each other and they must be assembled manually to cover the child in a car seat. The foregoing patent documents are hereby incorporated in their entireties for all purposes.

Therefore, there is a need for a child's garment that has an appropriate appearance, warmth, and comfort, and which is easy to be donned for the child both in and out of a car seat, which can be worn in a car seat but allowing for proper attachment of the restraint system. More generally, there is a need for a garment wearable by an individual using a harness system for a vehicle seat, wherein the garment is adapted to snuggly receive one or more harness straps of the harness system so as to reduce slack in the harness straps.

SUMMARY

The innovations disclosed herein overcome problems in the prior art and address one or more of the aforementioned or other needs. The inventive subject matter is generally directed to a garment wearable by an individual using a harness system of a vehicle seat, such as a fixed seat or a removable car seat for a child.

In one embodiment, the garment has an inner front layer and an adjacent outer front layer, wherein the outer front layer may have a higher compressibility than the inner front layer, and the garment is adapted to receive one or more harness straps of the harness system between the inner front layer and the outer front layer when the one or more harness straps are routed from a shoulder region to a waist region of the garment, and when so routed, the one or more harness straps lie flush against at least a chest area of the inner front layer.

In the foregoing and other embodiments, the inner front layer may have a left edge joining a left panel of the outer front layer and a right edge joining a right panel of the outer front layer, wherein a spatial distance between the left edge and the right edge may be progressively wider from the waist region to the left and right shoulder regions of the garment, and the spatial distance is sufficiently wide so as to accommodate the one or more harness straps.

In certain embodiments, the inner front layer has a first thickness when no force is applied via the one or more harness straps, and a second thickness in response to a predetermined force applied normally to the inner front layer via the one or more harness straps, and the ratio of the second thickness to the first thickness may be greater than a first predefined ratio. In certain embodiments, the outer front layer has a first thickness when no force is applied and a second thickness in response to a predetermined force applied normally to the outer front layer, and the ratio of the second thickness to the first thickness may be less than a second predefined ratio.

In the foregoing and other embodiments, the outer front layer may have a closable opening. In some embodiments, the opening in the outer front layer is opened and closed by a zipper.

In certain embodiments, the opening in the outer front layer may be sufficiently opened so as to expose and allow access to the one or more harness straps fastened over the inner front layer. In certain embodiments, the opening in the outer front layer may be sufficiently closed so as to cover and inhibit access to the one or more harness straps fastened over the inner front layer.

In the foregoing and other embodiments, the inner front layer may have an alignment marker for aligning a cross member of the harness system that interconnects a pair of vertically oriented harness straps that lie flush against at least the chest area of the inner front layer. In certain embodiments, the alignment marker may have a non-slip exterior surface area arranged to receive a portion of the pair of vertically oriented harness straps. In certain embodiments, the inner front layer may have a non-slip exterior surface extending from the shoulder region to the waist region.

In the foregoing and other embodiments, the garment may further include an inner collar corresponding to at least a posterior region of left and/or right sides of the individual's neck and an outer collar corresponding to at least an anterior region of left and/or right sides of the individual's neck, wherein the inner collar overlaps with the outer collar on left and/or right sides of the individual's neck so as to form left and/or right channels for respectively receiving one or two harness straps routed over left and/or right shoulder regions of the individual.

In certain embodiments, a first harness strap is received in the left channel and extends from the left shoulder region to left waist region of the garment, and a second harness strap is received in the right channel and extends from the right shoulder region to right waist region of the garment, and both the first and second harness straps lie flush against the chest area of the inner front layer.

In some other embodiments, only one harness strap is received in the left or right channel and extends from the left or right shoulder region to an opposite-side waist region of the garment, and the harness strap lies flush against the chest area of the inner front layer. In certain embodiments, the harness strap is adapted to interconnect with a lap strap of the harness system at the opposite-side waist region of the garment, wherein the lap strap is routed from left waist region to right waist region of the garment.

In another embodiment, the garment includes an inner front layer and an adjacent outer front layer, wherein the outer front layer may include a left panel, a right panel, and a coupling member adapted to join or separate the left panel and the right panel, wherein the inner front layer may have a left edge joining the left panel of the outer front layer, and a right edge joining the right panel of the outer front layer, wherein a spatial distance between the left edge and the right edge may be sufficiently wide so as to accommodate one or more harness straps of the harness system when the one or more harness straps are routed from a shoulder region to a waist region of the garment, and when so routed, the one or more harness straps lie flush against at least a chest area of the inner front layer. In some embodiments, the outer front layer may have a higher compressibility than the inner front layer.

In the foregoing and some other embodiments, the inner front layer has a first thickness when no force is applied via the one or more harness straps, and a second thickness in response to a predetermined force applied normally to the inner front layer via the one or more harness straps, and the ratio of the second thickness to the first thickness may be greater than a first predefined ratio. In the foregoing and some other embodiments, the outer front layer has a first thickness when no force is applied and a second thickness in response to a predetermined force applied normally to the outer front layer, and the ratio of the second thickness to the first thickness may be less than a second predefined ratio.

In certain embodiments, the coupling member may be a zipper. In the foregoing and other embodiments, the left panel and the right panel of the outer front layer may be sufficiently separated by the coupling member so as to expose and allow access to the one or more harness straps fastened over the inner front layer. In the foregoing and other embodiments, the left panel and the right panel of the outer front layer may be sufficiently joined by the coupling member so as to cover and inhibit access to the one or more harness straps fastened over the inner front layer.

In some embodiments, the inner front layer may have an alignment marker for aligning a cross member of the harness system that interconnects a pair of vertically oriented harness straps that lie flush against at least the chest area of the inner front layer. In some embodiments, the alignment marker may have a non-slip exterior surface area arranged to receive a portion of the pair of vertically oriented harness straps. In some embodiments, the inner front layer may have a non-slip exterior surface extending from the shoulder region to the waist region.

In the foregoing and other embodiments, the garment may further include an inner collar corresponding to at least a posterior region of left and/or right sides of the individual's neck and an outer collar corresponding to at least an anterior region of left and/or right sides of the individual's neck, wherein the inner collar overlaps with the outer collar on left and/or right sides of the individual's neck so as to form left and/or right channels for respectively receiving one or two harness straps routed over left and/or right shoulder regions of the individual.

In certain embodiments, a first harness strap is received in the left channel and extends from the left shoulder region to left waist region of the garment, and a second harness strap is received in the right channel and extends from the right shoulder region to right waist region of the garment, and both the first and second harness straps lie flush against the chest area of the inner front layer.

In some other embodiments, only one harness strap is received in the left or right channel and extends from the left or right shoulder region to an opposite-side waist region of the garment, and the harness strap lies flush against the chest area of the inner front layer. In some embodiments, the harness strap is adapted to interconnect with a lap strap of the harness system at the opposite-side waist region of the garment, wherein the lap strap is routed from left waist region to right waist region of the garment.

Yet in a further embodiment, the garment may include an inner front layer and an adjacent outer front layer, wherein the inner front layer may have a left edge joining a left panel of the outer front layer, and a right edge joining a right panel of the outer front layer, and the garment is configured to snuggly receive one or more harness straps of the harness system between the inner front layer and the outer front layer when the one or more harness straps are muted from a shoulder region to a waist region of the garment, and when so muted, the one or more harness straps may lie flush against a chest area of the inner front layer without substantially overlying the outer front layer when they are tightened.

In the foregoing and other embodiments, the chest area may be between a waist region and left and right shoulder regions of the garment, and each of the one or more harness straps may be routed over an upper surface of left or right shoulder of the individual. In the foregoing and other embodiments, the outer front layer may have a higher compressibility than the inner front layer.

These and other embodiments are described in more detail in the following detailed descriptions and the figures. Other embodiments are contemplated in the Detailed Description below and in the appended Figures, and in the claims, as originally written or amended, the claims as such being incorporated by reference into this Summary.

The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The appended figures show embodiments according to the inventive subject matter, unless noted as showing prior art.

DETAILED DESCRIPTION

Representative embodiments according to the inventive subject matter are shown in FIGS. 1-13, wherein the same or generally similar features share common reference numerals.

The inventive subject matter is generally directed to an individual's insulated or otherwise bulky garment worn over at least the upper body. The garment is adapted to keep the individual warm and comfortable sitting in a vehicle. It also has a utility, appearance and ease of use that are appropriate for when the individual is not sitting in the vehicle. For example, it may have the appearance and functionality of conventional garments and can be easily donned. More particularly, the garment may be a child's jacket, coat, vest, sweater, long coat, raincoat, jumpsuit, or other types of clothing worn over the upper body of the child, and the garment is configured to snuggly receive one or more harness straps of a harness system. A person of ordinary skill of art should understand from the teaching of this application that the garment may be suitable for a child or an adult. The harness system may be a standard 5-point harness system used in a child's car seat, or may be a 4-point, 5-point, or 6-point harness system (e.g., including two shoulder straps and two lap belts) used by race car drivers or pilots. Alternatively, the harness system may also be a regular vehicle restraint system that includes a shoulder harness, and optionally a lap belt.

By way of illustration and without any limitation, an item of child's jacket will be used hereafter to illustrate principles of the inventive subject matter. The garment may have various sizes and attributes (e.g., color, pattern, etc.) to accommodate the needs of children with respect to age, gender, size, and styles. For example, the garment may have different sites that can fit the infants, toddlers, and school age children who still need to ride the automobile with a car seat. One exemplary such garment is the Road Coat™, which is designed and manufactured by One Kid LLC. Fairfield, Conn.

The garment 1 has a rear portion 5 covering the back of the child's upper body, and a double-layer structure 8 that covers some or all of the front of the child's upper body. The double-layer structure 8 includes an inner front layer 10 and an adjacent outer front layer 20. The rear portion 5 and the outer front layer 20 may form a unitary piece, or they may be coupled together (e.g., by sewing or any type of fastening means), and collectively they encircle the child's upper body. Optionally, the garment 1 may include a pair of sleeves 2, and/or a hood 3, each of which may be permanently or detachably coupled to the garment 1.

The inner front layer 10 has an anterior surface and an exterior surface. The outer front layer 20 also has an anterior surface and an exterior surface. The anterior and/or the exterior surfaces of the inner front layer 10 and/or the outer front layer 20 may be made of the same or different fabric structures and/or materials. For example, the fabric may have a woven and/or knit structure, and the fabric material may be cotton, silk, natural or synthetic fibers, nylon, polyester, fleece, wool, or their combinations thereof, to provide desired comfort level and properties such as thermal insulation, windproofness, water-resistance or waterproofness, stain-resistance, breathability, elasticity, cut/tear resistance, or purely aesthetic features. The fabric sections may be formed as baffles that hold insulation, such as down or synthetic fill materials. Optionally, one or more pockets 4 may be sewn to the exterior and/or interior surfaces of the inner front layer 10 and/or the outer front layer 20. Other clothing accessories and/or decorative elements may be attached to the garment, as known in the art.

Figure 8:
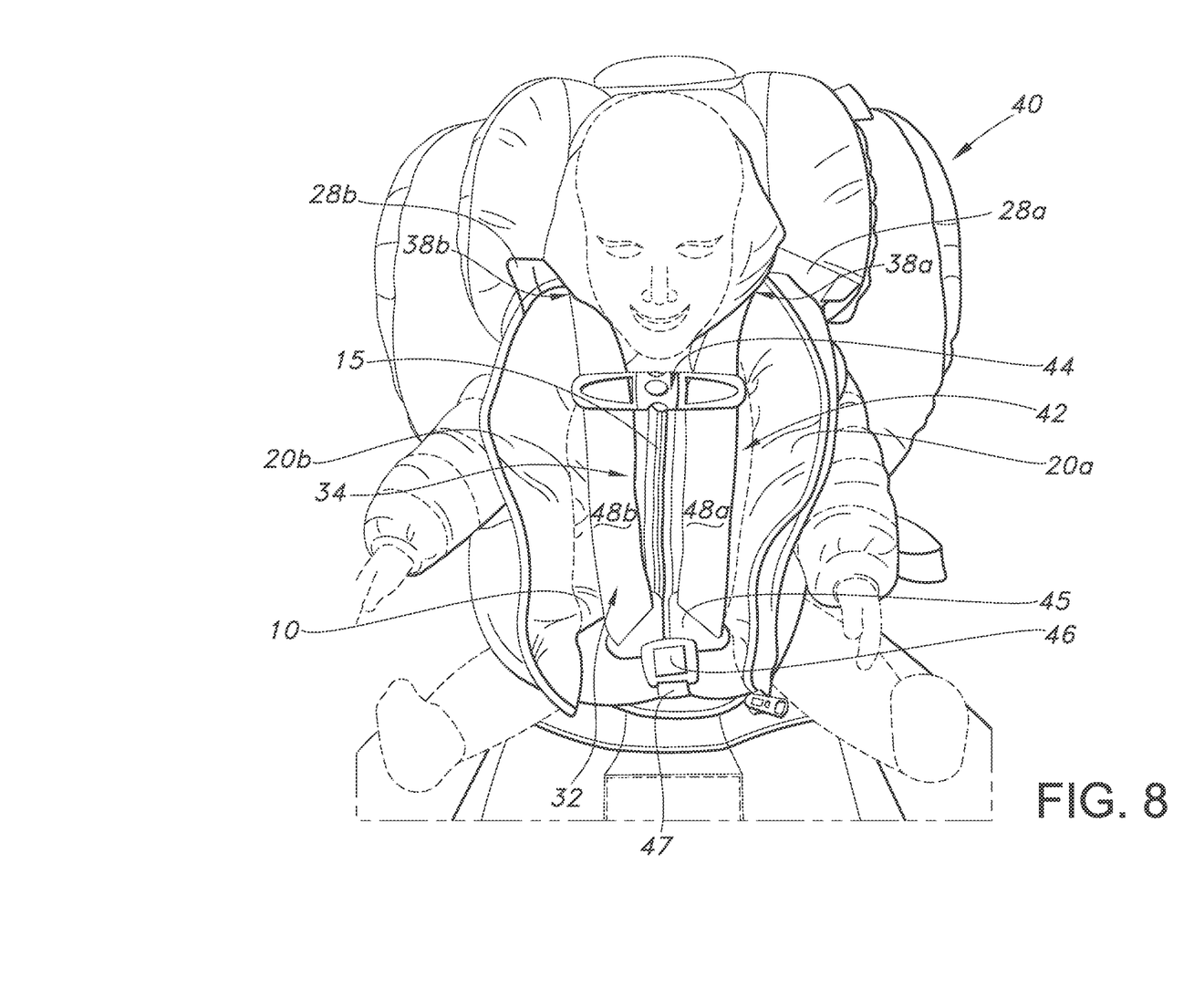
FIG. 8 shows a front view of a child sitting in a car seat and wearing the garment, the harness straps are fastened over the garment's inner front layer, and the garment's outer front layer is open.
Figure 9:
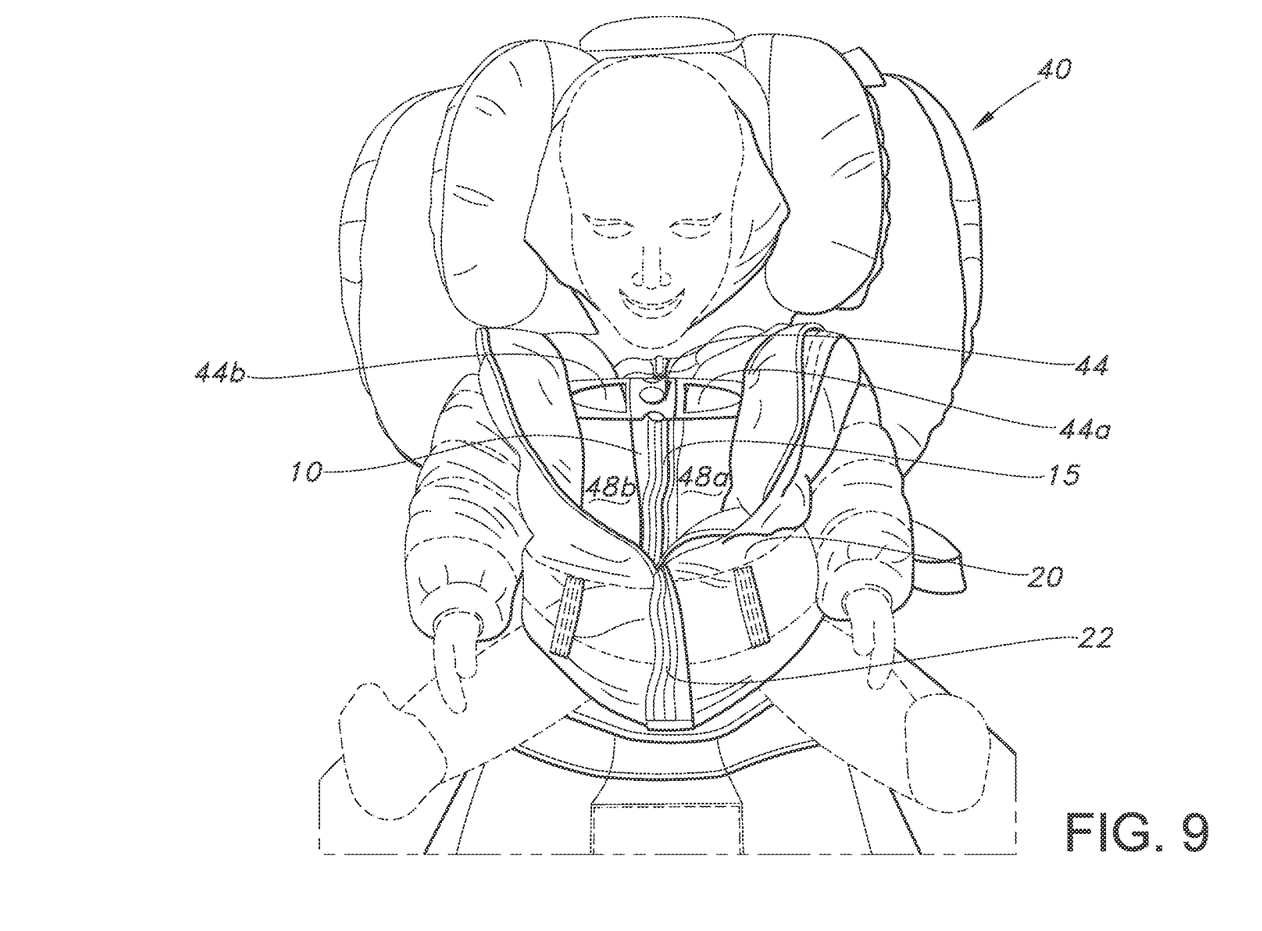
FIG. 9 shows a front view of the child sitting in a car seat and wearing the garment depicted in FIG. 8, the car seat's harness straps are fastened over the garment's inner front layer, and the garment's outer front layer is approximately half way closed.
Figure 10:
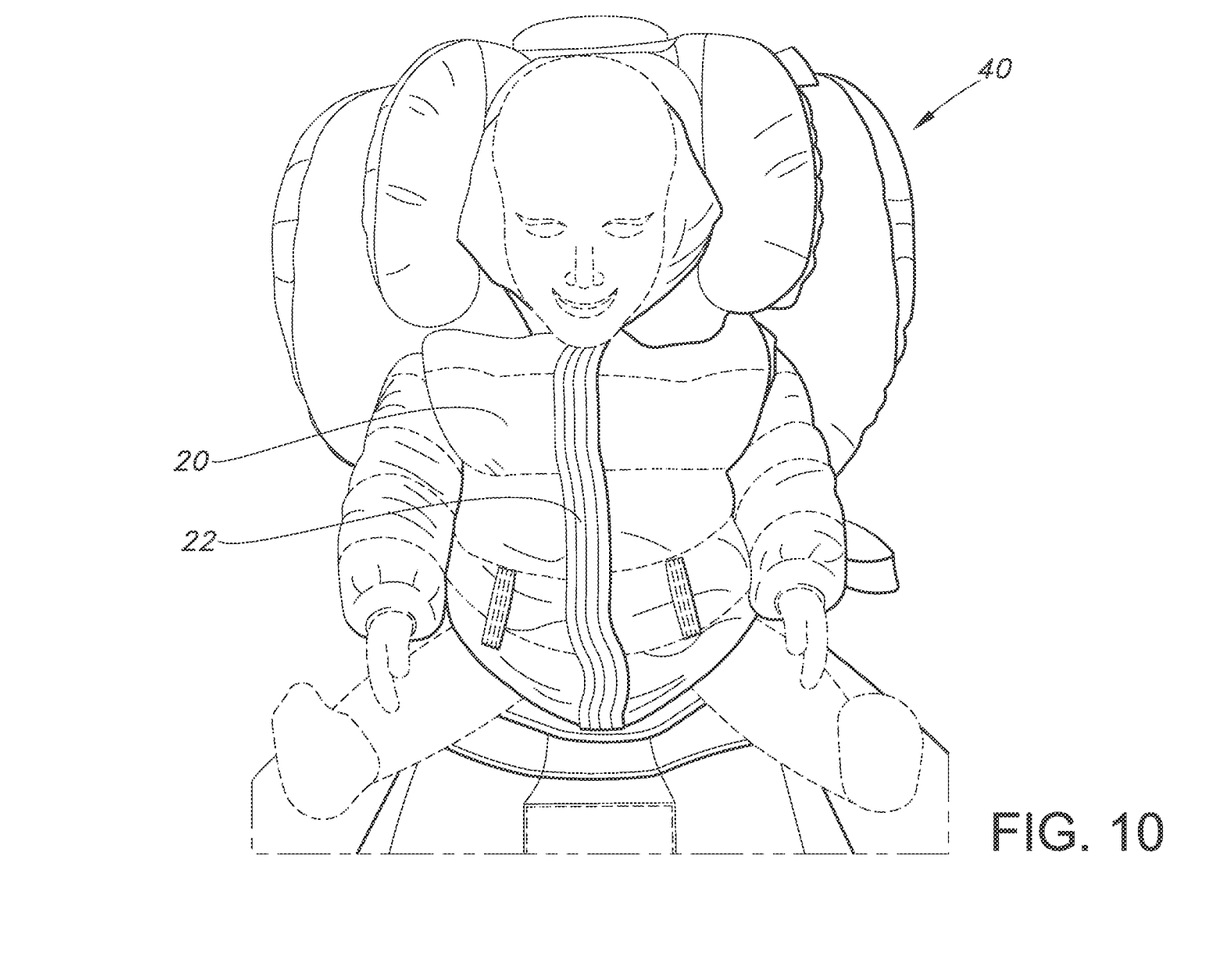
FIG. 10 shows a front view of the child sitting in a car seat and wearing the garment depicted in FIG. 8, the car seat's harness straps are fastened over the garment's inner front layer, and the garment's outer front layer is fully closed.

Referring to FIGS. 8-10, the garment 1 is adapted to receive one or more harness straps 42 of the car seat 40 between the inner front layer 10 and the outer front layer 20. More specifically, the one or more harness straps 42 may be fastened over the exterior surface of the inner front layer 10, and beneath the interior surface of the outer front layer 20.

Figure 11:
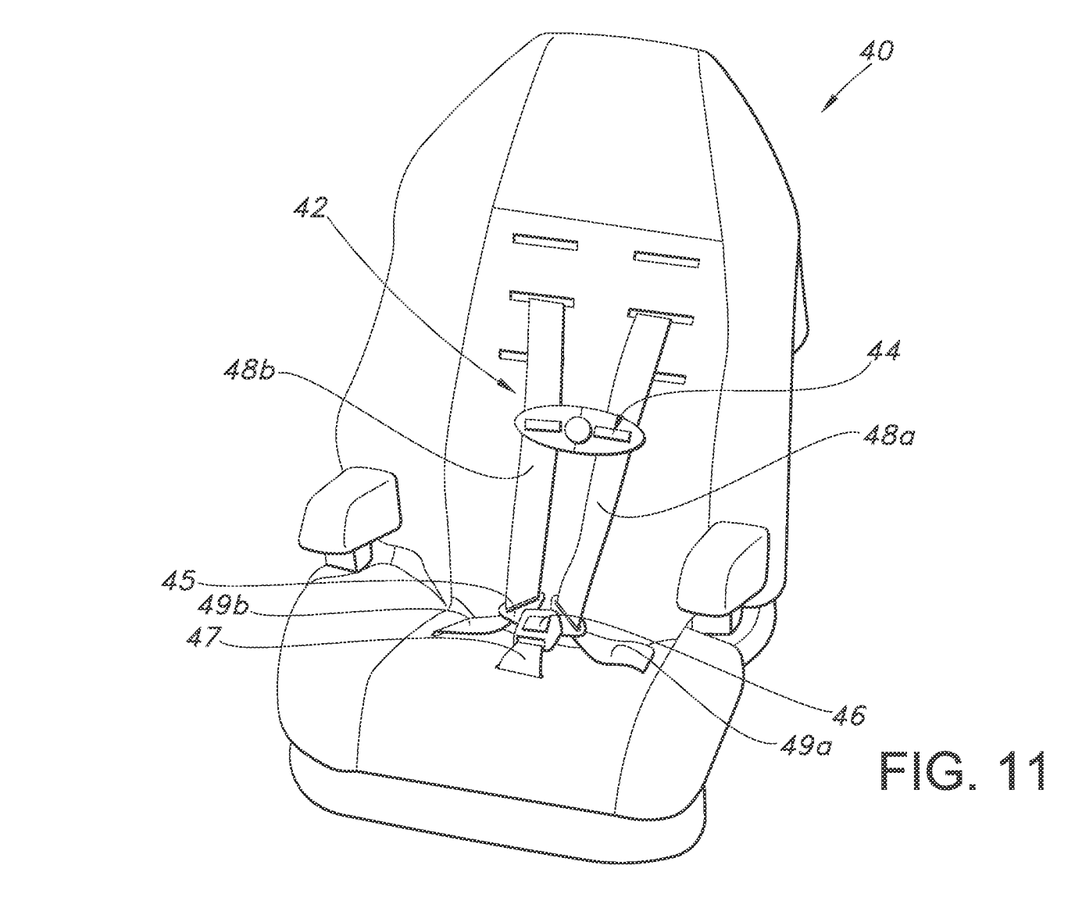
FIG. 11 shows a representative harness system in a car seat.

As illustrated in FIG. 11, a typical 5-point harness system of the car seat 40, may include a pair of harness clips 44a, 44b (or collectively referenced to chest or harness clips 44), a pair of shoulder straps 48a, 48b, a buckle 46 for receiving and releasing the tongues 45 of the shoulder straps (48a, 48b), a pair of hip straps 49a, 49b, a harness adjuster 47 for adjusting the tightness of the harness straps 42, etc. As described herein, the harness straps 42 may include any of the shoulder straps 48a, 48b, hip straps 49a, 49b, and the harness adjuster 47.

In a representative, non-limiting embodiment, the outer front layer 20 has a left panel 20a, a right panel 20b and a coupling member 22. The left panel 20a and the right panel 20b together may define a closeable opening, and the coupling member 22 is adapted to close or open the opening by joining or separating the left panel 20a and the right panel 20b. In one exemplary, non-limiting example, the coupling member 22 may be a zipper. Alternatively, the coupling member 22 may include snaps, a hoop and lock mechanism such as VELCRO®, button(s), buckle(s), clip(s), etc. In certain embodiments, the coupling member 22 of the outer front layer 20 may be located along the outer edges of the left and right panels (20a, 20b) that define the closeable opening. In an exemplary, non-limiting embodiment, the coupling member 22 may be generally parallel to a vertical axis Y, and the left panel 20a and the right panel 20b may be generally symmetric about a midline 14 of the garment.

In certain embodiments, the inner front layer 10 may also have a closeable front opening, for example, along a vertical midline 14. Similarly, the front opening of the inner front layer 10 may be opened and/or closed by any kind of coupling mechanism 15 such as zippers, snaps, VELCRO®, button(s), buckle(s), clip(s), etc. Alternatively, the inner front layer 10 may not have a closeable front opening. Instead, the inner front layer 10 may have a top opening in the neck region so that it may be put on the child from the top.

In a representative, non-limiting embodiment, the inner front layer 10 may have a left edge 12a joining the left panel 20a of the outer front layer, and a right edge 12b joining the right panel 20b of the outer front layer. The inner front layer 10 may be permanently joined with the outer front layer 20 along the edges (12a 12b), for example, by means of sewing, unitary, seamless weaving or knitting, welding, moulding, or fusing. Alternatively, the inner front layer 10 may be attached to the outer front layer 20 along the edges (12a, 12b) by detachable coupling mechanisms such as snaps, zippers, VELCRO®, button(s), buckle(s), clip(s), etc. The spatial distance between the left edge 12a and the right edge 12b along a horizontal axis X may define the width (W) of the inner front layer 10. If the inner front layer 10 has a closeable front opening, the width (W) may be measured when the front opening is closed.

Figure 1:
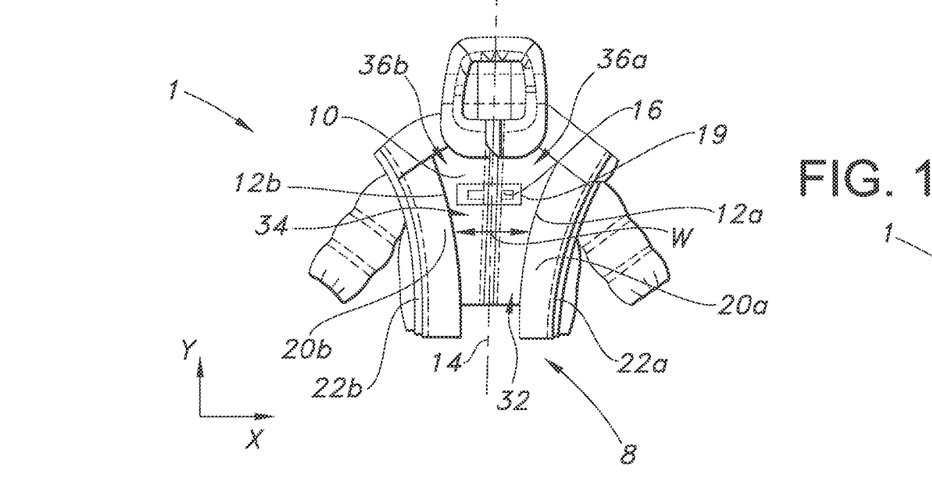
FIG. 1 shows a front view of a garment, and the garment's outer front layer is open.
Figure 2:
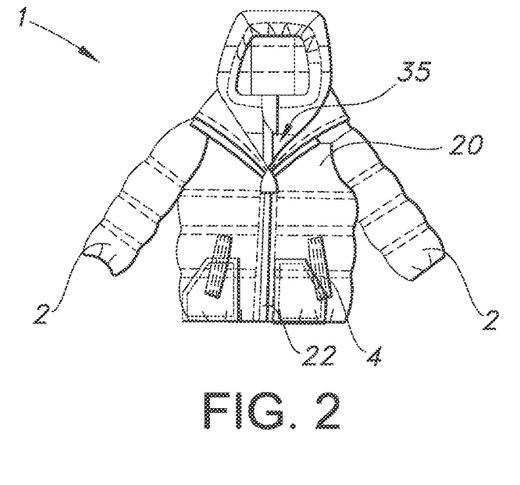
FIG. 2 shows a front view of the garment depicted in FIG. 1, with the outer front layer closed approximately ¾ of the length along a vertical axis at the midline.

According to a representative, non-limiting embodiment of the inventive subject matter shown in FIG. 1, the spatial distance between the left edge 12a and the right edge 12b, or the width (W) of the inner front layer may be relatively narrow in the waist region 32, becoming progressively wider toward the left and right shoulder regions 36a, 36b of the garment. When the left panel 20a and the right panel 20b are joined together, a gap or space 35 may be formed between the inner front layer 10 and the outer front layer 20, with the left edge 12a and the right edge 12b respectively defining the left and right boundaries of the gap or space 35. For example, this gap or space 35 may be based on the nature of the loose stacking of the front layer 10 against the outer front layer 20. The width (W) of the inner front layer 10 may be sufficiently wide to accommodate the harness straps 42 of the car seat, including the shoulder straps 48a, 48b, the hip straps 49a, 49b, and the harness adjuster 47, as well as the chest clips 44 and the buckle 46. In other words, the width (W) of the inner front layer 10 may be sufficiently wide so that the gap or space between the inner front layer 10 and the outer front layer 20 may be large enough to receive the components of the harness straps 42, including, the shoulder straps 48a, 48b, hip straps 49a, 49b, and harness adjuster 47, as well as the chest clips 44 and the buckle 46. The left and right shoulder straps 48a, 48b generally run from the respective left and right should regions 36a, 36b to at least the waist region 32 of the garment, and lie flush against at least a chest area 34 of the inner front layer 10.

Figure 5:
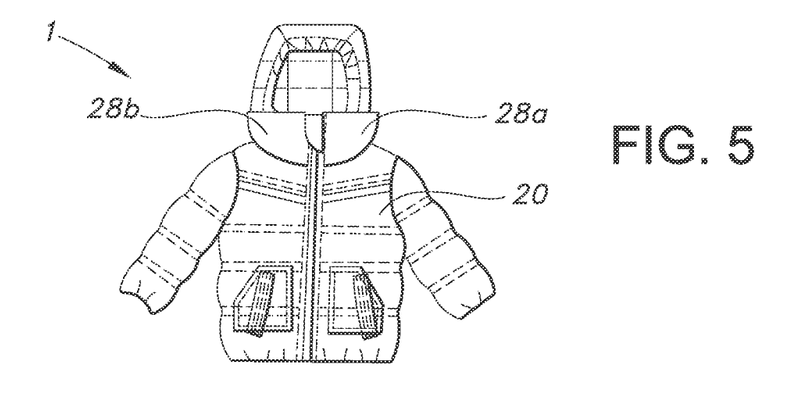
FIG. 5 shows a front view of the garment depicted in FIG. 1, with the outer front layer fully closed along a vertical axis at the midline.

In a representative, non-limiting embodiment, the garment 1 is configured to snuggly receive the harness straps 42 of the car seat 40 between the inner front layer 10 and the outer front layer 20 when left and right shoulder straps 48a, 48b are tightened, so that both the left and right shoulder straps 48a, 48b may lie flush against a chest area 34 of the inner front layer 10 without substantially overlying the outer front layer 20. The chest area 34 may be between a waist region 32 and the left and right shoulder regions 36a, 36b of the garment, and the left and right shoulder straps 48a, 48b may be routed over respective upper surfaces 38a, 38b of the left and right shoulders of the child. In a representative, non-limiting embodiment, the opening in the outer front layer 20 may be sufficiently opened, e.g., by uncoupling the coupling member 22 and pulling the left panel 20a and right panel 20b apart, so as to expose and allow access to the harness straps 42 fastened over the inner front layer 10, as shown in FIGS. 1, 5 and 8. This may facilitate a parent to conveniently secure and adjust the harness straps 42 over the child in the car seat or to release the harness straps 42 and remove the child from the car seat.

Figure 7:
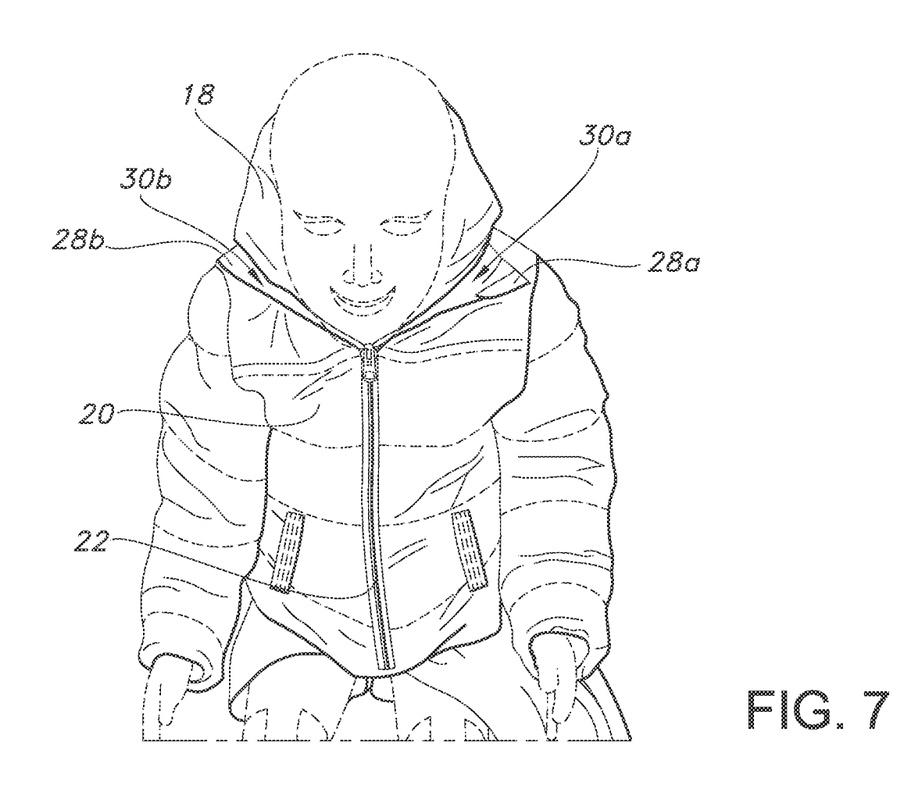
FIG. 7 shows a front view of the child wearing the garment depicted in FIG. 6, and the garment's outer front layer is fully closed.

In a representative, non-limiting embodiment, the opening in the outer front layer 20 may be sufficiently closed, e.g., by completely joining the left panel 20a and right panel 20b together through the coupling member 22, so as to cover and inhibit access to the harness straps 42 fastened over the inner front layer 10, as shown in FIGS. 5, 7 and 10. This may prevent the child from playing with the harness straps 42 and accidently unbuckling the chest clips or loosen the harness straps, and/or sliding his or her arms out of the harness straps 48a, 48b.

In certain embodiments, the inner front layer 10 and the outer front layer 20 may be constructed to have desired compressibility to keep the child warm and to improve the safety of the child in a car seat relative to conventional bulky garments. Compressibility described herein is a measure of the relative thickness (or volume) change of a garment area as a response to a force applied normally (or pressure) via one or more harness straps to the garment area. During sudden braking or collision conditions, a child sitting in car seat will experience a force or pressure when the harness straps become taut against the body. As the clothing beneath the harness straps is significantly compressed by the applied force or pressure, slack is taken out and the child may lose the protection from the harness straps. The force (F) or pressure applied to the child by the harness straps of the car seat may be predetermined by direct measurement. e.g., using a force or pressure sensor attached to a dummy sitting in a car seat in an automobile crash test, or by theoretical calculations based on physical parameters including the automobile's speed, stopping distance, child's body weight, etc.

Thus, in a representative embodiment, the inner front layer 10 may have a relatively low compressibility, so that when a collision force is applied to the child via the harness straps, the thickness of the inner front layer may not change significantly. Specifically, the inner front layer 10 may have a first thickness (Di1) when no force is applied (i.e., uncompressed), and a second thickness (Di2) in response to a predetermined force or pressure (F) applied normally to the inner front layer 10 (i.e., compressed). The ratio of the second thickness to the first thickness (Di2/Di1) may be greater than a first predefined ratio (Ri). The ratio Di2/Di1 may be between 0 and 1, and it may correlate with the compressibility of the inner front layer 10. A higher Di2/Di1 ratio may generally correspond to lower compressibility and a lower Di2/Di1 ratio may generally correspond to higher compressibility of the inner front layer 10.

Also in a representative, non-limiting embodiment, the outer front layer 20 can have a relatively high compressibility, e.g., due to highly compressible filling materials as described below, so that it may offer good thermal insulation to the child. Specifically, the outer front layer 20 may have a first thickness (Do1) when no force is applied (i.e., uncompressed), and a second thickness (Do2) in response to a predetermined force or pressure (F) applied normally to the inner front layer 10 (i.e., compressed). The ratio of the second thickness to the first thickness (Do2/Do1) may be less than a second predefined ratio (Ro). The ratio Do2/Do1 may be between 0 and 1, and it may reflect the compressibility of the outer front layer 20. A higher Do2/Do1 ratio may generally correspond to lower compressibility and a lower Do2/Do1 ratio may generally correspond to higher compressibility of the outer front layer 20.

Also in a representative, non-limiting embodiment, the compressibility of the outer front layer 20 (Ro) is higher than the compressibility of the inner front layer 10 (Ri). In other words, the outer front layer 20 is more compressible than the inner front layer 10.

Different types and/or amount of fill material may be used in different parts of the garment 1 (e.g., the rear portion 5, the sleeves 2, the hood 3, the inner front layer 10, the outer front layer 20, etc.) to achieve a desired level of compressibility and thermal insulation for different parts of the garment 1. The fill material may be, for example, particles or bats of natural or synthetic down or feathers, vegetable or animal fibers or fur, natural or synthetic fibers such as polyester, foam, or various combinations thereof, as known in the art or to be discovered, that are insulating material suitable for use in garments. Each part of the garment 1 may include one or more layers of fabrics. In certain embodiments, baffle constructs may be used in selective parts of the garment 1 to restrict the movement of the fill material.

In one possible, non-limiting embodiment, the uncompressed outer front layer may have a thickness of 0.25 to 2 inches or thereabout. The inner front layer may have a thickness of 0.05 to 0.5 inches or thereabout. The ratio Ro2/Ro1, which reflects the compressibility of the outer front layer 20, may be between 0.1 and 0.5, with uncompressed outer front layer 20 being at least 0.5 inch thick. The ratio Ri2/Ri1, which reflects the compressibility of the inner front layer 10, may be between 0.8 and 1, with uncompressed outer front layer between 0.1 and 0.5 inches. In one example, the outer front layer may have a thickness of 0.75 inch or thereabout, and the inner front layer may have a thickness of 0.0625 inch or thereabout.

In a representative, non-limiting embodiment, the exterior surface of the inner front layer 10 may have an alignment marker 16 for aligning a cross member (e.g., the chest clips) of the harness straps 42. The vertical location of the alignment marker 16 may generally correspond to the height of armpits of the child wearing the garment. The alignment marker 16 may be located in a chest area 34, symmetric along the midline 14, and can be visibly perceived when the outer front layer 20 is opened. Thus, the alignment marker 16 can offer a visual cue for a parent who can easily identify the correct location to place the chest clips 44 of the harness straps 42.

Figure 12:
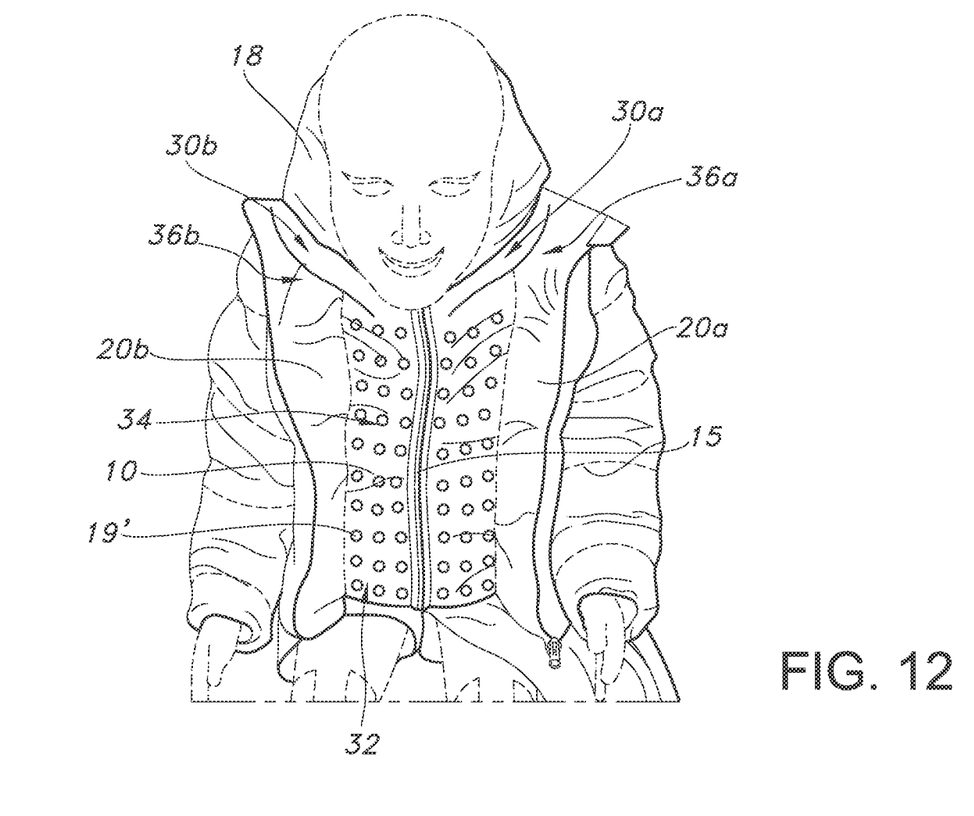
FIG. 12 shows a front view of a child wearing the garment, wherein the inner front layer of the garment has a non-slip exterior surface extending from the shoulder region to the waist region.

In a representative, non-limiting embodiment, the exterior surface of the inner front layer 10 may have a non-slip exterior surface area 19 corresponding to the alignment marker 16 and for receiving a portion of the pair of vertically oriented shoulder straps 48a, 48b. For example, the non-slip exterior surface area 19 may surround or may be located coextensive with the alignment marker 16, so that when the chest clips 44 are properly aligned with the alignment marker 16, they will be placed over the non-slip exterior surface area 19. In some embodiments, the non-slip exterior surface area 19 may be constructed from slip resistant material such as silicone, or natural or synthetic rubber. In some alternative embodiments, the non-slip exterior surface area 19 may be a mechanical retention system, such as a groove, or a clip system, etc. The surface need not be a contiguous surface but can be formed as bands, dots, etc., to define a general surface area. Thus, when the chest clips 44 are properly aligned with the alignment marker 16, they may have a tendency to stay in the non-slip exterior surface area 19 and resist the urge to move or shift to a different location due to shaking or vibrating of the automobile during transport. In an alternative embodiment, as shown in FIG. 12, the exterior surface of the inner front layer 10 may have a non-slip exterior surface 19' that extends from the shoulder regions 36a, 36b to the waist region 32 of the garment. Thus, the non-slip exterior surface 19' will resist the movement of the harness straps 42 relative to the inner front layer 10.

According to a representative, non-limiting embodiment, the garment 1 may further include an inner collar 18 generally corresponding to at least a posterior region of the left and right sides of the child's neck, and outer collars 28a, 28b generally corresponding to at least an anterior region of the left and right sides of the child's neck. In certain embodiments, the inner collar 18 and the outer collars 28a, 28b may be coupled together by VELCRO® or other types of fastener, such as zippers, snaps, button(s), buckle(s), clip(s), etc. The inner collar 18 and/or the outer collars 28a, 28b may be fixedly (e.g., by means of sewing, weaving, knitting, etc.) or detachably coupled (e.g., by means of zippers, VELCRO®, etc.) to different parts of the garment 1. Alternatively, the inner collar 18 and/or the outer collars 28a, 28b may form part(s) of a unitary piece of the garment. For example, the inner collar 18 may be part of, or coupled to, the rear portion 5 of the garment 1. In another example, the outer collars 28a, 28b may be part of, or coupled to, the outer front layer 20 of the garment 1.

Figure 3:
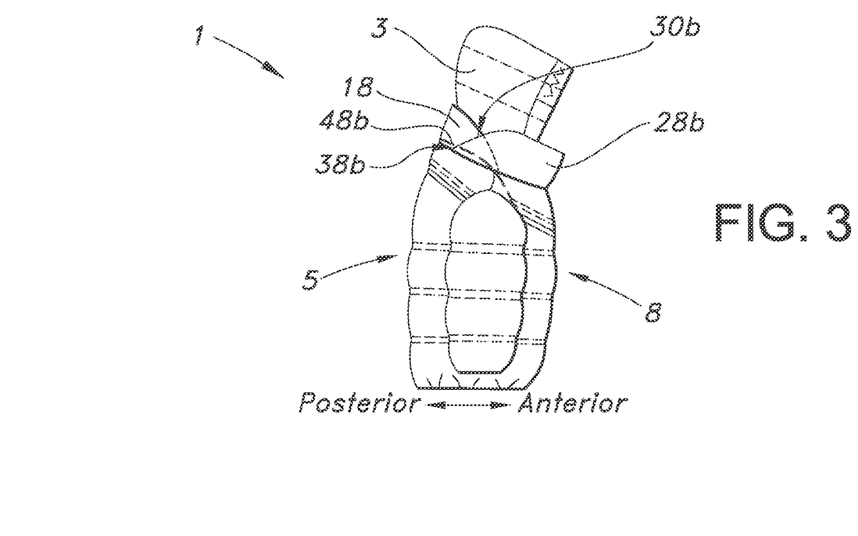
FIG. 3 shows a right side view of the garment depicted in FIG. 1.
Figure 4:
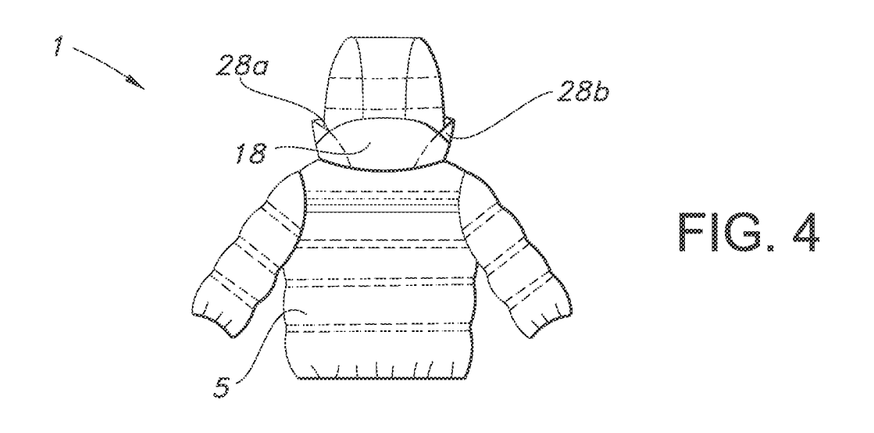
FIG. 4 shows a back view of the garment depicted in FIG. 1.
Figure 6:
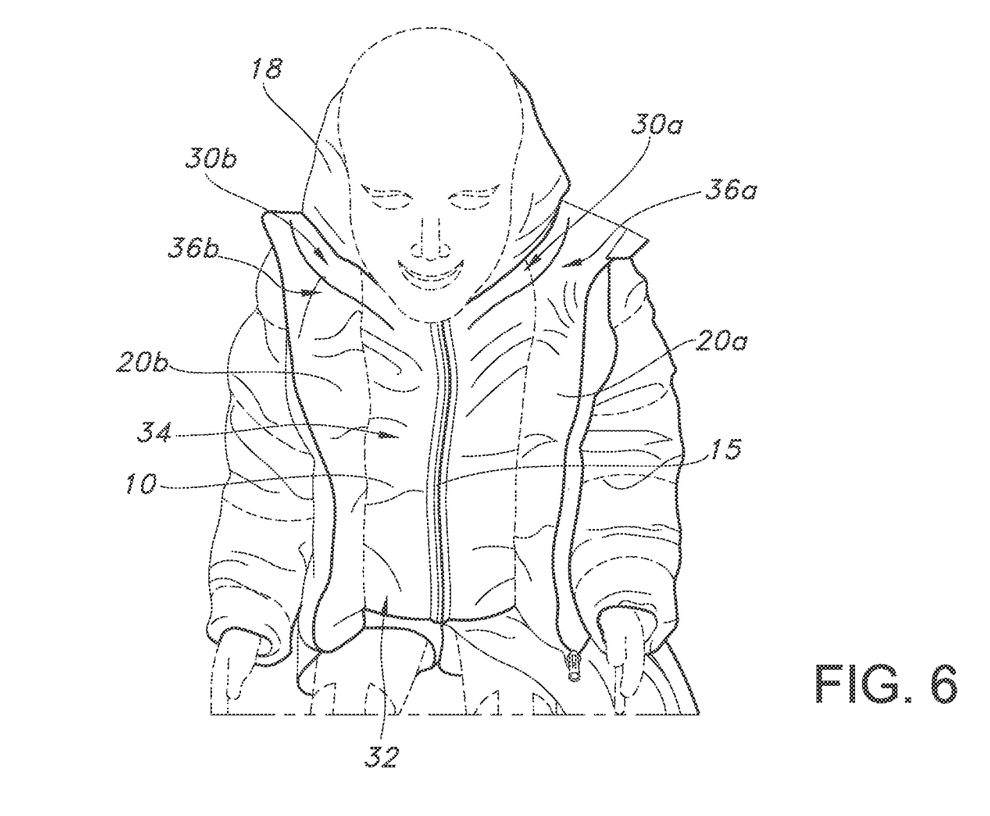
FIG. 6 shows a front view of a child wearing the garment, and the garment's outer front layer is open.

As illustrated in FIGS. 3, 4 and 6, the outer collars 28a, 28b may extend on both left and right sides of the neck. On each side, the width of the outer collars 28a, 28b may taper from the anterior to the posterior region of the neck. In some embodiments, the outer collars 28a. 28b on each side of the neck may form a trapezoid-like shape. In certain embodiments, the outer collars 28a, 28b may diminish in width significantly or even disappear at the back of the neck. The inner collar 18 may extend from the back of the neck to the left and right sides of the neck. In each side, the width of the inner collar 18 may taper from the posterior to the anterior region of the neck. In certain embodiments, the inner collar 18 may diminish in width significantly or even disappear in the anterior region of left and right sides of the neck.

As illustrated in FIGS. 3, 6-7, in certain embodiments, the inner collar 18 may be overlapped at least partially by the outer collars 28a, 28b on left and/or right sides of the child's neck so as to form left and/or right channels 30a, 30b, respectively. The channel 30a or 30b may be formed in a manner so that the overlapping inner collar 18 is closer to the neck of the wearer than the overlapping outer collar 28a or 28b. The left channel 30a may be generally located near the left shoulder region 36a, formed by the left posterior part of the inner collar 18 overlapping at least partially with the left anterior part of the outer collar 28a. The right channel 30b may be generally located near the right shoulder region 36b, formed by the right posterior part of the inner collar 18 overlapping at least partially with the right anterior part of the outer collar 28b. The left and right channels 30a, 30b may be adapted to respectively receive the left and right shoulder straps 48a, 48b near the shoulder regions 36a, 36b of the child. For the purpose of illustration, FIG. 3 schematically shows the right shoulder strap 48b being received in channel 30b near the right shoulder region 36b. In other words, the channels 30a, 30b may form the entrances and/or exits for the shoulder straps 48a, 48b to enter and/or exit the space formed between the inner front layer 10 and the outer front layer 20. For example, to secure the harness straps 42 on a child, the shoulder straps 48a, 48b of the car seat can be pulled from behind the back of the child, over the shoulders of the child through the respective channels 30a, 30b, and then fastened over the inner front layer 10 through the chest clips 44 and the buckle 46. The overlapping inner collar 18 may also prevent the shoulder straps 48a, 48b from touching or irritating the child's neck skin. In addition, the overlapping outer layers 28a, 28b may also prevent the shoulder straps 48a, 48b from shifting away from the desired shoulder location. Thus, the channels 30a, 30b may provide a further protective mechanism to secure the harness straps.

Figure 13:
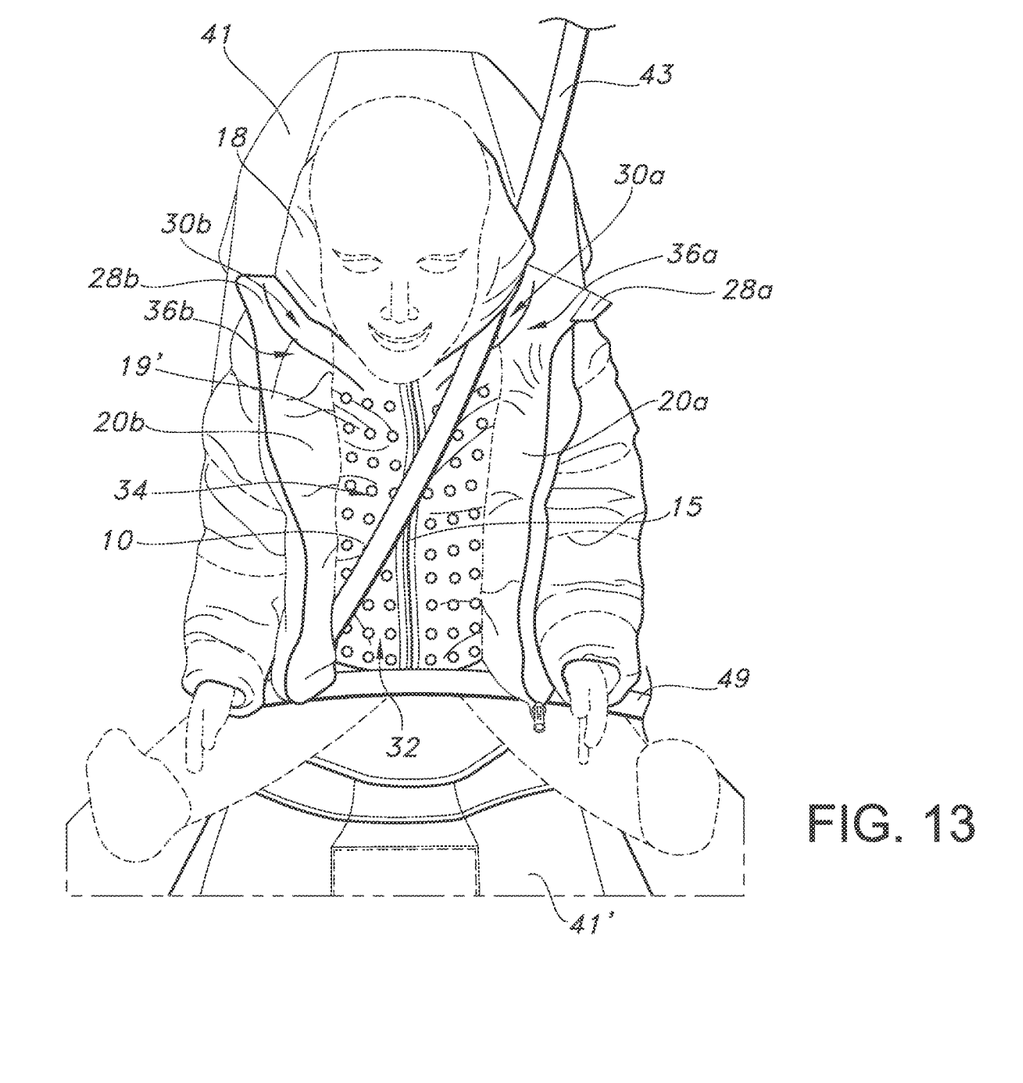
FIG. 13 shows a front view of a child wearing the garment depicted in FIG. 12, wherein the child is restrained by a shoulder harness and a lap belt of a regular vehicle restraint system.

FIG. 13 illustrates another embodiment according to the inventive subject matter, where the child is sitting in a booster seat 41' rather than a car seat as described above. A child sitting in a booster seat may use regular vehicle restraint system instead of the standard 5-point harness system of the car seat. As shown, the child wearing the garment depicted in FIG. 12 sits on a booster seat 41' that is placed on a regular vehicle seat 41. The child uses a regular vehicle restraint system including a shoulder harness 43 and a lap belt 49. In this example, the shoulder harness 43 is received in the left channel 30a and extends from the left shoulder region 36a to the right side of the waist region 32. The lap belt 49, which may be optional, extends from the left side to the right side of the waist region 32. The shoulder harness 43 interconnects with the lap belt 32 at the right side of the waist region 32. Although not shown, it should be understood the shoulder harness 49 may be received in the right channel 30b and extends from the right shoulder region 36b to the left side of the waist region 32, and interconnects with the lap belt 32 at the left side of the waist region 32. Further, it should be understood that the booster seat 41' may be removed, so that an older child or an adult who wears the garment described above may sit directly on the vehicle seat 41 and be properly restrained by the shoulder harness 43, and optionally the lap belt 49.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

As used herein, "and/or" means "and" or "or", as well as "and" and "or". Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The inventors reserve all rights to the subject matter disclosed herein, including the right to claim all that comes within the scope and spirit of the following claims:

The invention claimed is:

1. A garment wearable by an individual using a harness system for a vehicle seat, the garment comprising:
   an inner front layer defining a shoulder region;
   an adjacent outer front layer;

an outer collar fixedly coupled to and disposed at the shoulder region of the garment and extending continuously between an anterior side and a posterior side of the garment on a side of the individual's neck; and an inner collar disposed at a back of the garment and extending toward the shoulder region on the left side and right side of the individual's neck, wherein the inner collar overlaps partially with the outer collar on a left side and/or a right side of the individual's neck so as to define a left channel and/or a right channel for respectively receiving one or two harness straps routed between the overlapped portions of the inner collar and the outer collar over a left shoulder region and/or a right shoulder region of the individual;

wherein the outer front layer has a higher compressibility than the inner front layer; and the garment is adapted to receive one or more harness straps of the harness system in the left channel and/or the right channel and between the inner front layer and the outer front layer when the one or more harness straps are routed from the shoulder region to a waist region of the garment, and when so routed, the one or more harness straps lie flush against at least a chest area of the inner front layer.

2. The garment of claim 1, wherein the inner front layer has a left edge joining a left panel of the outer front layer, and a right edge joining a right panel of the outer front layer, wherein a spatial distance between the left edge and the right edge is progressively wider from the waist region to the shoulder region of the garment, and the spatial distance is sufficiently wide so as to accommodate the one or more harness straps.

3. The garment of claim 1, wherein the inner front layer has a first thickness when no force is applied via the one or more harness straps, and a second thickness in response to a predetermined force applied normally to the inner front layer via the one or more harness straps, wherein the second thickness is less than the first thickness, and the ratio of the second thickness to the first thickness is greater than a first predefined ratio.

4. The garment of claim 3, wherein the outer front layer has a first thickness when no force is applied, and a second thickness in response to a predetermined force applied normally to the outer front layer, and the ratio of the second thickness to the first thickness is less than a second predefined ratio, wherein the second predefined ratio is higher than the first predefined ratio.

5. The garment of claim 1, wherein the outer front layer has a closable opening.

6. The garment of claim 5, wherein the opening in the outer front layer can be sufficiently opened so as to expose and allow access to the one or more harness straps fastened over the inner front layer.

7. The garment of claim 5, wherein the opening in the outer front layer can be sufficiently closed so as to cover and inhibit access to the one or more harness straps fastened over the inner front layer.

8. The garment of claim 1, wherein the inner front layer has an alignment marker for aligning a cross member of the harness system that interconnects a pair of vertically oriented harness straps that lie flush against at least the chest area of the inner front layer.

9. The garment of claim 8, wherein the alignment marker has a non-slip exterior surface area arranged to receive a portion of the pair of vertically oriented harness straps.

10. The garment of claim 1, wherein the inner front layer has a non-slip exterior surface extending from the shoulder region to the waist region.

11. The garment of claim 1, wherein a first harness strap is received in the left channel and extends from the left shoulder region to a left waist region of the garment, and a second harness strap is received in the right channel and extends from the right shoulder region to a right waist region of the garment, and both the first and second harness straps lie flush against the chest area of the inner front layer.

12. The garment of claim 1, wherein only one harness strap is received in the left or right channel and extends from the left or right shoulder region to an opposite-side waist region of the garment, and the harness strap lies flush against the chest area of the inner front layer.

13. The garment of claim 12, wherein the harness strap is adapted to interconnect with a lap strap of the harness system at the opposite-side waist region of the garment, wherein the lap strap is routed from a left waist region to a right waist region of the garment.

14. A garment wearable by an individual using a harness system of a vehicle seat, the garment comprising:
an inner front layer defining a shoulder region;
an adjacent outer front layer comprising a left panel, a right panel and a coupling member adapted to join or separate the left panel and the right panel;
an outer collar fixedly coupled to, and disposed at, the shoulder region of the garment and extending continuously between an anterior side and a posterior side of the garment on a side of the individual's neck; and
an inner collar disposed at a back of the garment and extending toward the shoulder region on the left side and right side of the individual's neck, and the inner collar partially overlaps with the outer collar on a left side and/or a right side of the individual's neck so as to define a left channel and/or a right channel for respectively receiving one or two harness straps routed between the overlapped portions of the inner collar and the outer collar and over a left shoulder region and/or a right shoulder region of the individual;

wherein the inner front layer has a left edge joining the left panel of the outer front layer, and a right edge joining the right panel of the outer front layer, wherein a spatial distance between the left edge and the right edge is sufficiently wide so as to accommodate one or more harness straps of the harness system when the one or more harness straps are routed through the left channel and/or the right channel from the shoulder region to a waist region of the garment, and when so routed, the one or more harness straps lie flush against at least a chest area of the inner front layer.

15. The garment of claim 14, wherein the outer front layer has a higher compressibility than the inner front layer.

16. The garment of claim 14, wherein the inner front layer has an alignment marker for aligning a cross member of the harness system that interconnects a pair of vertically oriented harness straps that lie flush against at least the chest area of the inner front layer, wherein the alignment marker has a non-slip exterior surface area arranged to receive a portion of the pair of vertically oriented harness straps.

17. The garment of claim 14, wherein the inner front layer has a non-slip exterior surface extending from the shoulder region to the waist region.

18. A garment wearable by an individual using a harness system of a vehicle seat, the garment comprising:
an inner front layer defining a shoulder region;
an adjacent outer front layer; and an inner collar disposed at a back of the garment and extending toward the shoulder region of the garment, and an outer collar disposed at the shoulder region of the garment, wherein the outer collar extends continuously between an anterior side and a posterior side of the garment on a right side or a left side of the individual's neck and an anterior part of the inner collar overlaps with a posterior part of the outer collar on the left side and/or the right side of the individual's neck so as to define a left channel and/or a right channel for respectively receiving one or two harness straps of the harness system routed between the overlapped portions of the inner collar and the outer collar over a left shoulder region and/or a right shoulder region of the individual;

wherein the garment is configured to snuggly receive one or more harness straps of the harness system between the inner front layer and the outer front layer when the one or more harness straps are routed from the left and/or right shoulder region to a waist region of the garment, and when so routed, the one or more harness straps lie flush against at least a chest area of the inner front layer when they are tightened.

19. The garment of claim 8, wherein the alignment marker is positioned at a vertical location corresponding to a height of armpits of the individual.

20. A garment wearable by an individual using a harness system for a vehicle seat, the garment comprising:
an inner front layer defining a shoulder region;
an adjacent outer front layer;
an outer collar fixedly disposed at the shoulder region of the garment;
an inner collar disposed at a back of the garment, extending toward and ending at the shoulder region of the garment, wherein an anterior end of the inner collar overlaps partially with a posterior part of the outer collar on a left side and/or a right side of the individual's neck so as to define a left channel and/or a right channel for respectively receiving one or two harness straps of the harness system routed over a left shoulder region and/or a right shoulder region of the individual;
wherein the inner collar and the outer collar in combination are configured to encircle the neck of the individual;
wherein the outer front layer has a higher compressibility than the inner front layer; and
the garment is adapted to receive one or more harness straps of the harness system between the inner front layer and the outer front layer when the one or more harness straps are routed between the overlapped portions of the inner collar and the outer collar from the shoulder region to a waist region of the garment, and when so routed, the one or more harness straps lie flush against at least a chest area of the inner front layer.

21. The garment of claim 18, wherein a width of the inner collar tapers from the posterior to the anterior side of the garment, and wherein a width of the outer collar tapers from the anterior to the posterior side of the garment.

22. A garment wearable by an individual using a harness system for a vehicle seat, the garment comprising:
a rear portion covering a back of the individual;
a front layer coupled to the rear portion and having a closable opening;
an outer collar fixedly disposed at a shoulder region of the garment; and
an inner collar disposed at the rear portion of the garment, wherein an anterior end of the inner collar overlaps partially with a posterior part of the outer collar on a left side and/or a right side of the individual's neck so as to define a left channel and/or a right channel for respectively receiving one or two harness straps of the harness system routed over a left shoulder region and/or a right shoulder region of the individual;
wherein the inner collar and the outer collar in combination are configured to encircle the neck of the individual; and
the garment is adapted to receive one or more harness straps of the harness system beneath the front layer when the one or more harness straps are routed between the overlapped portions of the inner collar and the outer collar from the shoulder region to a waist region of the garment, and wherein the closable opening is configured to expose and allow access to the one or more harness straps when opened and configured to cover and inhibit access to the one or more harness straps when closed.

* * * * *